United States Patent [19]
Engert

[11] Patent Number: 4,782,572

[45] Date of Patent: Nov. 8, 1988

[54] TOOL FOR RELEASING A PIPE JOINT OF TWO PIPES FITTED INTO EACH OTHER

[76] Inventor: Albert Engert, Rügshöfer Strasse 28, 8723 Gerolzhofen, Fed. Rep. of Germany

[21] Appl. No.: 941,196

[22] Filed: Dec. 12, 1986

[30] Foreign Application Priority Data

Dec. 28, 1985 [DE] Fed. Rep. of Germany ....... 3546287

[51] Int. Cl.[4] ............................................. B23P 19/04

[52] U.S. Cl. ..................................... 29/234; 29/426.5

[58] Field of Search .................. 29/234, 243.53, 426.5; 72/412, 454, 455, 457; 269/53

[56] References Cited

U.S. PATENT DOCUMENTS 2,105,954 1/1938 Rippe .................................... 269/43

4,162,570 7/1979 Trittipoe ........................... 72/412 X 4,471,516 9/1984 Godbe ............................. 72/412 X

*Primary Examiner*—Timothy V. Eley

[57] ABSTRACT

This invention provides a tool for releasing a pipe joint of two pipes of which one is fitted inside the other and the outer pipe is provided with an opening, such as a slot, in the region of the pipe joint. The tool comprises a mandrel located on a pressing means, as well as at least one hook which is pivotally fastened thereto and mounted such that a counter plate located at the end of the hook is adapted to be brought into a position opposite to the mandrel. The pressing means may be implemented as a threaded spindle, as a hydraulic or pneumatic cylinder.

11 Claims, 1 Drawing Sheet

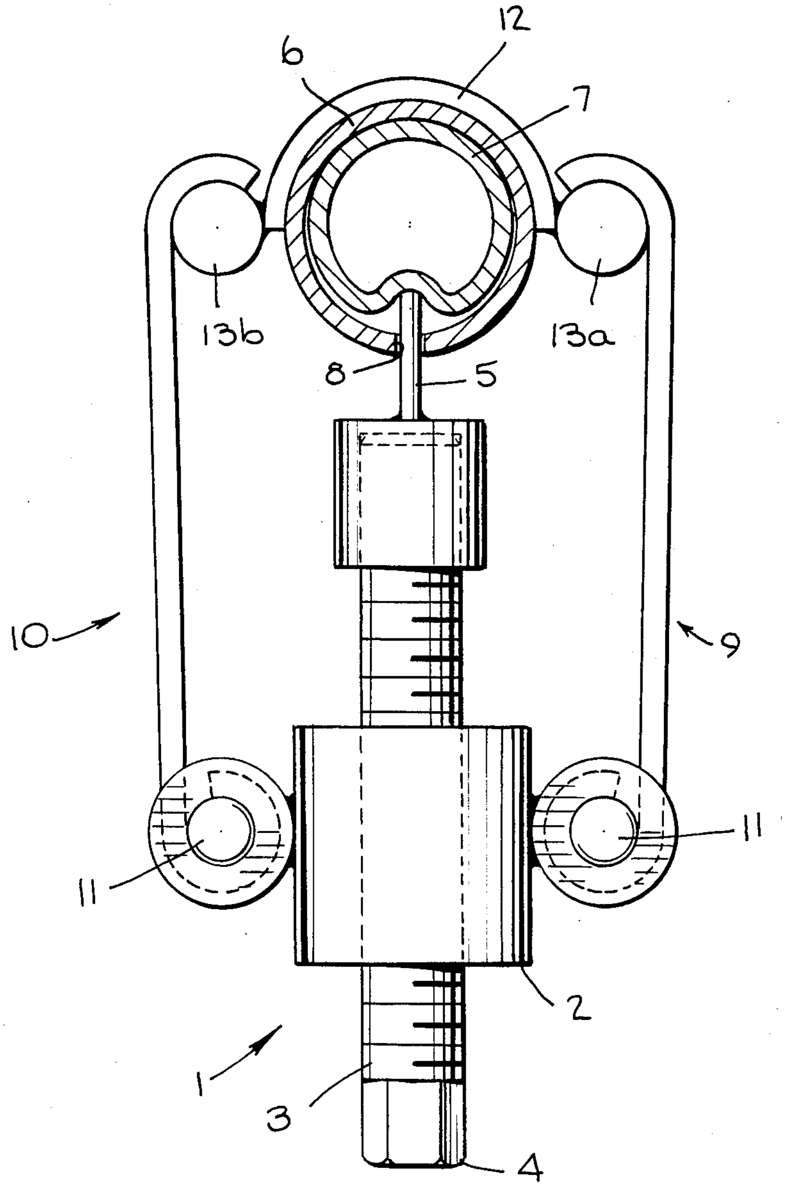
12
6
7
13b
13a
8
5
10
9
11
11
2
1
3
4

TOOL FOR RELEASING A PIPE JOINT OF TWO PIPES FITTED INTO EACH OTHER

BACKGROUND OF THE INVENTION

Technical Field of the Invention

This invention relates to a tool for releasing a pipe joint of two pipes of which one is fitted inside the other and the outer pipe is provided with an opening, such as a slot, in the region of the pipe joint.

Description of the Prior Arts

Pipe joints of this type are produced by push-connecting the ends of the two pipes to be joined; this is possible because at the end region, the outer diameter of the one pipe is about equal to or slightly smaller than the inner diameter of the other pipe. By push-connection, a clamp-fit is obtained, which produces a frictional joint. To improve elasticity, longitudinal slots are often provided in the outer pipe, i.e. in the region of the later pipe joint, whereby pushing onto the later inner pipe can be considerably facilitated. Because of their simplicity, such pipe joints are in general use and, as a rule, they are employed and used in automotive vehicles to connect the exhaust pipes to each other. It is especially this application which, after a certain time of use, leads to such a tight joint and jamming together of the two pipe ends that the release of the pipe joint which is necessary for replacing a muffler is only possible with difficulty and necessitates heating for expanding the outer pipe or beating it open. This work is time-consuming and complicated and must often be carried out in vehicle repair shops because of the great wear of exhaust systems.

SUMMARY OF THE INVENTION

On this basis, it is the object of the present invention to provide a tool with the help of which such a pipe joint can be released easily and quickly.

This problem is solved by mounting a mandrel on a pressing means and by pivotally mounting at least one hook in such a manner that a counter plate located at the end of the hook is adapted to be brought into a position opposite to the mandrel. The pressing means whose structural implementation within the scope of this invention is in principle arbitrary for the moment has the effect that the mandrel mounted thereon is slidable by exerting the required forces. The pivotable mounting of at least one hook must be carried out such that the counter plate located at the end of the hook is adapted to be brought into a position which is opposed to the mandrel, i.e. counter plate and mandrel are then located in a straight line. By reason of the displaceability of the mandrel, which is effected by the pressing means, the distance thereof with respect to the counter plate can be varied. Said counter plate is located at the end of the hook; this encompasses both the case of a rigid connection which is necessary when a single hook is used, and loose attaching and fitting. At least in the region of its tip, the mandrel is dimensioned such that it engages the opening or slot provided in the outer pipe. The tool of the present invention is used such that the mandrel is first inserted into the opening or slot of the outer pipe, because of the pivotability of the hook, the counter plate is then brought into a position opposed to the mandrel so that after operation of the pressing means, the mandrel comes to rest against the pipe joint from the one side and the counter plate at the opposite side. When the pressing means is further operated, the mandrel passing through the opening or slot of the outer pipe deforms the inner pipe such that it detaches from the inner wall of the outer pipe and reduces its crosssection. In this manner, a separation of outer and inner pipes is carried out so that now the two pipes fitted into each other can be separated from each other and the pipe joint is released. It is in principle conceivable that when the inner pipe is used again, its deformation must or should be reversible; this can, for instance, be accomplished by axially inserting or forcing in a mandrel of a corresponding outer diameter; this only requires a slight additional effort.

The advantages which can be achieved through this invention lie in the fact that on the one hand especially rusted and solidly jammed pipe joints, too, as are usually present, in particular in exhaust systems, can be released at all and that on the other hand, when the tool of this invention is used, this work can be carried out considerably faster and with less physical effort and therefore more easily than has so far been the case.

In a concrete embodiment of the pressing means, this invention provides the use of a threaded spindle or a hydraulic or pneumatic cylinder without any restriction of generality. In a manner which is known per se, the threaded spindle consists of a shaft which is referred to as a spindle and which upon rotation executes a longitudinal movement and is supported in a spatially fixed spindle nut. The mandrel is provided at the one end of the spindle; with regard to said mandrel, there is a possibility of rotation, for instance by integrally forming a hexagonal head for fitting a wrench. The force exerted by the mandrel on the inner pipe is then determined by the force applied with respect to the rotation and the pitch of the screw thread. The pressing means can be also implemented as a hydraulic or pneumatic cylinder independently thereof, the mandrel being then integrally formed on the piston rod and the force being generated by the actuation of the cylinder by means of a hydraulic or pneumatic medium.

To carry the forces of reaction and also to accomplish a firm support, especially during the deformation phase, a counter plate, which is at least provided on one hook, is mounted on the side of the pipe joint which is opposite to the mandrel. The pivotability ensures that at the beginning of work the counter plate is fitted around the pipe joint and after completion of work it can be simply removed again. In a further embodiment the number 2 is suggested in this invention as the number of hooks which are here used; this permits the installation of one hook on each side of the pipe joint and thereby the generation of symmetrical force ratios. Here the counter plate can be rigidly connected to one of the hooks or, however, it is loosely retained from behind by both hooks under the application of force.

Finally, in a particularly advantageous embodiment, the pressing means is the one leg of a gripper whilst the hook with the counter plate represents the other leg. The mandrel is inserted into the opening or slot of the outer pipe in the same manner, and the gripper is held such that during closing the counter plate comes to rest against the side of the pipe joint which is diametrically opposite to the mandrel and during further operation, the inner pipe is deformed in the manner already described and the inner pipe is thereby separated from the outer pipe. The forces of pressure are produced by operating the gripper and are transferred by the lever arm thereof to the mandrel and the counter plate, respectively. The development of the tool of this invention as a gripper permits especially fast work because, after the mandrel has been inserted in one single movement, the counter plate is brought into its position and subsequently the inner pipe is deformed by continuing the movement whilst the pressure is maintained.

The use of the tool of this invention substantially follows from its construction. This use was already explained in detail in connection with the description of the tool itself. It cannot be inferred from the construction thereof that it is possible to return the inner pipe to its original shape by forcing in a mandrel; this is in particular advisable whenever the inner pipe is used again and a similar pipe joint is to be obtained again.

BRIEF DESCRIPTION OF THE DRAWING

Further details, features and advantages of the present invention will be apparent from the following detailed description of one embodiment when taken in connection with the accompanying FIGURE of the drawing. In a side elevation and a schematic representation, it shows a tool of this invention in use.

DETAILED DESCRIPTION OF THE DRAWING

The pressing means 1 shown in the drawing consists of a spindle nut 2 in which the spindle 3 is rotatably supported by means of a screw thread. At the outer end thereof, a hexagonal head 4 on which a wrench is fitted, whereby the spindle can be rotated, is integrally formed on the spindle 3. A mandrel 5 which, when the spindle 3 is rotated, executes a forward or backward movement in dependence upon the direction of turn is mounted at the opposite end thereof.

The pipe joint to be released is produced by fitting an outer pipe 6 and an inner pipe 7 into each other; both of said pipes are shown in the drawing in sectional view and therefore hatched. The outer pipe 6 has here a slot 8 which is engaged by the mandrel 5 which, during the forward movement imparted by the pressing means, deforms the inner pipe 7 in the manner drawn in or, however, in another manner and thereby detaches it from the outer pipe 6, whereby the pipe joint becomes separable.

To carry the forces of reaction occurring during the forward drive of the mandrel 5, in particular during the deformation phase, a right hook 9, as well as a left hook 10 are movably mounted via pivot axes 11 on the spindle nut 2 at the sides so that they are movable in the plane of the drawing. Said hooks 9, 10 grip the edges 13*a*, 13*a* of a counter plate 12 from behind; the counter plate, for its part, comes to rest from the opposite side against the pipe joint and directly against the outer pipe 6. For this purpose, the counter plate 12 is formed as a complement to the outer pipe 6 as well as to the ends of the hooks 9, 10.

There is such a use that the mandrel 5 is inserted into the slot 8, the counter plate is rested against the outer pipe 6 approximately from the opposite side, and subsequently the two hooks 9, 10 are moved upwards so far until they come to rest on the respective point of the counter plate 12. In principle, a reversed order would also be conceivable, i.e. to mount the counter plate 12 first of all, to connect it to the hooks 9, 10 and it is only then that the mandrel 5 is inserted. Subsequently, the spindle is rotated—by fitting a wrench on the hexagonal head 4—such that the mandrel 5 is driven forwards and thereby produces a deformation of the inner pipe 7, for instance in the manner shown in the drawing, whereby the cross-section thereof is constricted; this causes a release from the outer pipe 6 so that the two pipes 6, 7 are pulled apart and the pipe joint can be released. In case the inner pipe 7 is reutilized, the deformation caused by the release of the pipe joint can be easily and simply reversed by axially pressing in another mandrel of a corresponding diameter. With reference to the drawing, this may be accomplished, for example, by rotating inner pipe 7 approximately 180°, from its position shown in the drawing, and rotating spindle 3 to extend mandrel 5 so that, by proper adjustment of pipe 7, mandrel 5 may at least partially contact the deformed portion of inner pipe 7, thereby reversing the deformation.

In conclusion, the present invention provides a tool with the help of which a pipe joint produced by fitting two pipes into each other - as occurs in automotive vehicles—can be released quickly and with little effort.

What is claimed is:

1. A tool for releasing a pipe joint, wherein said pipe joint is formed as a result of an interference fit in which an inner pipe is fitted inside an outer pipe, said inner pipe having an outer surface diameter which is slightly less than an inner surface diameter of said outer pipe, said tool comprising:

pressing means having a mandrel mounted thereon so that said pressing means is capable of forcing said mandrel through a slot in said outer pipe, the slot being in the vicinity of said pipe joint, in order to at least partially deform the diameter of said inner pipe, said pressing means further including at least one hook pivotally mounted thereon; and, a counter plate having at least one edge, said edge being capable of being gripped by said hook of said pressing means so that said counter plate is in a position opposite to said mandrel and said counter plate is thereby capable of securing said pipe joint so that said mandrel is capable of said deforming of the diameter of said inner pipe.

2. The tool according to claim 1, wherein said pressing means is a threaded spindle.

3. The tool according to claim 1, wherein said pressing means is a hydraulic cylinder.

4. The tool according to claim 1, wherein said pressing means is a pneumatic cylinder.

5. The tool according to claim 1, wherein said pressing means includes two of said hooks so that said hooks are each capable of gripping one of said edges of said counter plate, said edges having a shape which complements the shape of said hooks.

6. The tool according to claim 1, wherein said pressing means is a first leg of a gripper and said hook, in combination with said counter plate, is a second leg.

7. A tool for releasing a pipe joint, wherein said pipe joint is formed as a result of an interference fit in which an inner pipe is fitted inside an outer pipe, said inner pipe having an outer surface diameter which is slightly less than an inner surface diameter of said outer pipe, said tool comprising:

pressing means having a mandrel mounted thereon so that said pressing means is capable of forcing said mandrel through a slot in said outer pipe, the slot being in the vicinity of said pipe joint, in order to at least partially deform the diameter of said inner pipe, said pressing means further including two hooks pivotally mounted thereon; and, a counter plate having edges, said edges having a shape which complements the shape of said hooks with each of said edges being capable of being gripped by one of said hooks of said pressing means so that said counter plate is in a position opposite to said mandrel and said counter plate is thereby capable of securing said pipe joint so that said mandrel is capable of said deforming of the diameter of said inner pipe.

8. The tool according to claim 7, wherein said pressing means is a threaded spindle.

9. The tool according to claim 7, wherein said pressing means is a hydraulic cylinder.

10. The tool according to claim 7, wherein said pressing means is a pneumatic cylinder.

11. The tool according to claim 7, wherein said pressing means is a first leg of a gripper and said hook, in combination with said counter plate, is a second leg

* * * * *